United States Patent [19]

Carpenter et al.

[11] 4,157,374
[45] Jun. 5, 1979

[54] DISPOSAL OF WASTE GASES FROM PRODUCTION OF ALUMINUM CHLORIDE

[75] Inventors: Lee G. Carpenter, Murrysville; Vito Cedro, III, Pittsburgh; Donald L. Kinosz, Lower Burrell, all of Pa.

[73] Assignee: Aluminum Company of America, Pittsburgh, Pa.

[21] Appl. No.: 859,927

[22] Filed: Dec. 12, 1977

Related U.S. Application Data

[63] Continuation-in-part of Ser. No. 765,346, Feb. 3, 1977, abandoned.

[51] Int. Cl.² ............................................. C01B 7/00
[52] U.S. Cl. ................................... 423/210; 423/240; 423/242; 423/245; 423/246
[58] Field of Search ............... 423/210, 224, 240, 242, 423/245, 246, 336, 481, 488, 612, 613, 592, 246

[56] References Cited

U.S. PATENT DOCUMENTS

| | | | |
|---|---|---|---|
| 1,451,399 | 4/1923 | Low | 423/336 |
| 2,682,930 | 7/1954 | Krchma | 423/240 |
| 3,314,753 | 4/1967 | Richert et al. | 423/240 |
| 3,615,163 | 10/1971 | Brzozowski | 423/240 |
| 3,932,583 | 1/1976 | Schievelbein | 423/232 |
| 3,980,755 | 9/1976 | Black et al. | 423/240 |

OTHER PUBLICATIONS

Hudson; R., "The Vapour Phase Hydrolysis of Non Metallic Chlorides" International Congress of Pure Applied Chemistry, London Proceedings, vol. II, pp. 297–305, (1947).

*Primary Examiner*—Brian Hearn
*Attorney, Agent, or Firm*—David J. Hill; John P. Taylor

[57] ABSTRACT

Waste gases containing 15% or less vaporized chlorides are processed to recover chlorine values as HCl by filtration of particulate material followed by the adsorption of metal chlorides on carbon beds and subsequent hydrolyzing of the metal chlorides at a temperature of 100°–150° C. to form metal oxides and HCl. The remaining gases such as $COCl_2$ are further hydrolyzed to recover aqueous HCl and then the gases are scrubbed and finally incinerated to provide a discharge to the atmosphere containing $CO_2$, $N_2$, $H_2O$, $O_2$ and about 5ppm HCl.

12 Claims, 1 Drawing Figure

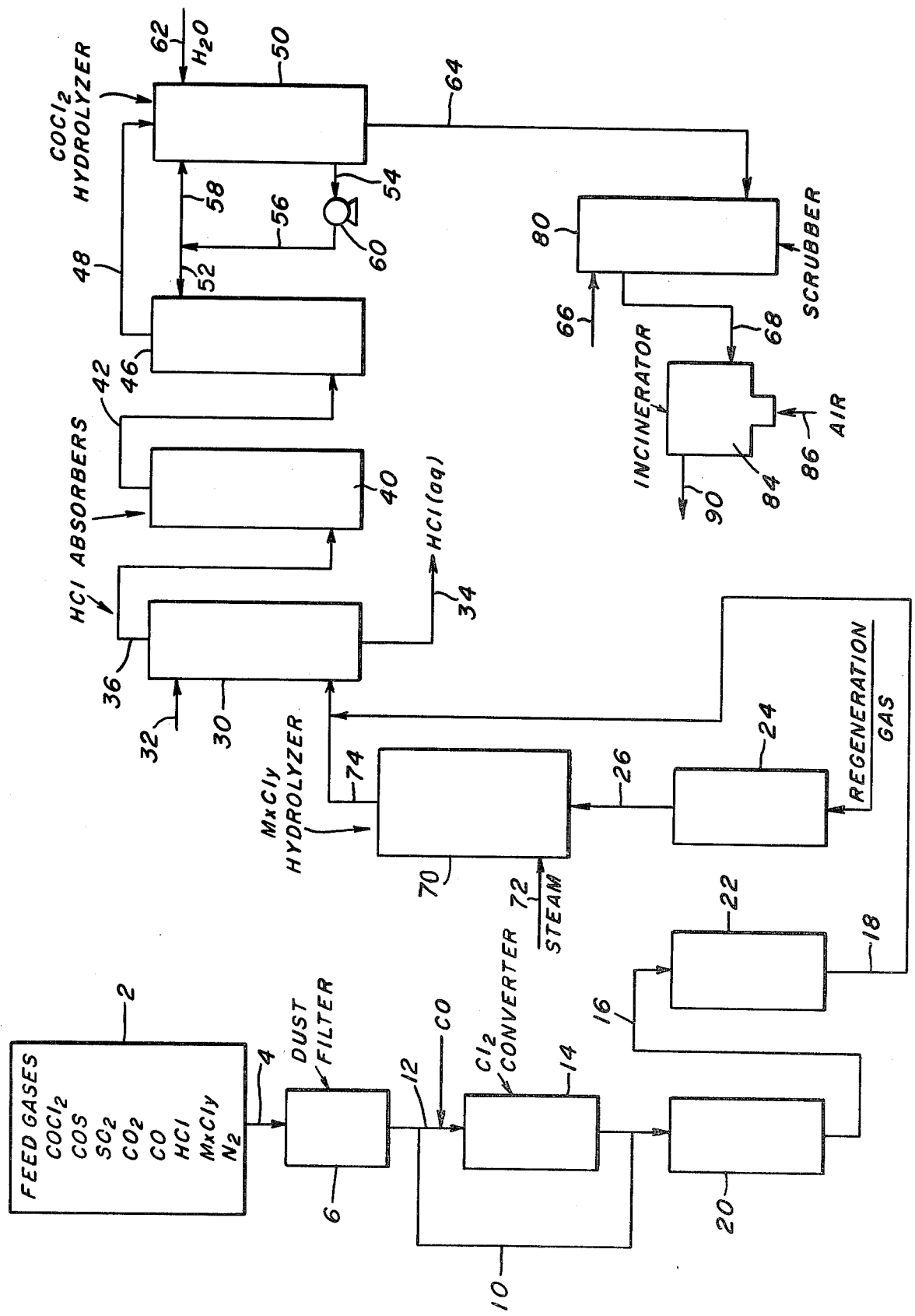

DISPOSAL OF WASTE GASES FROM PRODUCTION OF ALUMINUM CHLORIDE

CROSS-REFERENCE TO RELATED APPLICATIONS

This application is a continuation-in-part of U.S. Patent Application Ser. No. 765,346 filed Feb. 3, 1977 (now abandoned).

BACKGROUND OF THE INVENTION

This invention relates to waste gas treatment and more particularly to treatment of waste gases from production of aluminum chloride containing minor amounts (15% or less) of HCl, $COCl_2$, and vaporized metal chlorides capable of hydrolyzing to HCl and the corresponding metal oxides.

Halogen-containing gases and vapors, such as phosgene ($COCl_2$), HCl, silicon tetrachloride, titanium tetrachloride, iron chloride, and aluminum chloride, as well as $Cl_2$ present in the waste gas from an aluminum chloride reactor must be removed from the gas before it is emitted to the atmosphere even when present at low levels of 15% or less. While it is well known, for example, that silicon tetrachloride will react with water to form a gelatinous precipitate commonly referred to as silica gel, this reaction is not desired and, in fact, it is to be avoided because of the plugging of the pipelines and vessels which can occur upon formation of this gelatinous precipitate.

Lowe U.S. Pat. No. 1,451,399 indicates that if silicon chloride is contacted with a jet of steam at a temperature above the dehydration temperature of silicic acid, the silicon chloride will be hydrolyzed to form silica as well as hydrogen chloride by the reaction:

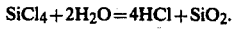

$$SiCl_4 + 2H_2O = 4HCl + SiO_2.$$

However, in actual practice, it has been found that this conversion at ordinary steam temperatures of about 100° C. results in low reaction rates.

R. F. Hudson in "The Vapor Phase Hydrolysis of Non-Metallic Chlorides" published in Volume 11 of the *International Congress of Pure Applied Chemistry London Proceedings* in 1947 indicated that this reaction must be carried out at much higher temperatures. He reports that Daubree noted that silicon tetrachloride and water vapor react at red heat in the presence of oxygen to give highly crystallized silica. Hudson then states that as oxygen and silicon tetrachloride do not react until higher temperatures are employed, this indicates a vapor phase hydrolysis at temperatures on the order of 700° C. Hudson then experimentally verified this by reporting experiments conducted in the temperature range of 25°–100° C. wherein no vapor phase hydrolysis of the silicon tetrachloride apparently occurred, at least without the presence of a small deposit of what he termed as "silicon". Hudson then states that he did observe reaction to obtain highly crystallized silica at a temperature of 400° C.

It is also known to produce metal oxides from metal halides in fluidized beds. For example, Hughes et al U.S. Pat. Nos. 3,043,657; 3,043,659; and 3,043,660 are addressed to the production of metal oxides such as titanium dioxide or silicon dioxide by reacting the corresponding chloride with oxygen or air in a fluidized bed at temperatures of 500° C. or higher. Van Weert U.S. Pat. No. 3,642,441 reacts metal chlorides with steam or water vapors in a fluidized bed. However, again the bed is operated at an elevated temperature of 600° C. or higher by the combustion of a gas such as propane in the fluidized bed.

While these reported reactions do, of course, solve the problem of disposal of metal chlorides such as silicon chloride without the formation of undesirable gelatinous products, the proposed temperatures for carrying out the reactions make such processes economically unattractive. Of course, it is recognized that these references had the production of such oxides from concentrated chloride vapors as their objects rather than the purification of gases containing minor or trace amounts of chlorides. It is therefore an object of this invention to provide a process for purification of waste gases including halogenated gases capable of being hydrolyzed by conversion of the gases to form solid metal oxides by hydrolysis without the excessive use of heat. These and other objects of the invention will be apparent from the specification and drawing.

SUMMARY OF THE INVENTION

In accordance with the invention, waste gases containing 15% by weight or less of gaseous halogenated compounds including metal chlorides are treated to convert those metal chlorides capable of hydrolyzing to oxides and to HCl by contacting the gases with water vapor at a temperature of 100°–150° C. while passing the gases through a bed of solid particles selected from the class consisting of carbon and metal oxides of groups IIA, IIIA, IVA, IVB and mixtures thereof, and thereafter contacting the gases with liquid water at a temperature of from 20°–100° C. to remove HCl vapors therefrom.

In a preferred embodiment the gases are first passed through a dust filter and then through a bed of activated carbon to remove at least a portion of the halogen compounds. A stripping gas is then passed through the activated carbon bed to remove the halogenated compounds deposited thereon. The stripping gas containing the metal chlorides is then contacted with water vapor in the presence of particulate carbon; metal oxides of groups IIA, IIIA, IVA, IVB: and mixtures thereof, as described above. The HCl formed is absorbed in liquid water to produce an aqueous hydrochloric acid solution.

The gases are then passed through a bed of activated carbon in the presence of water to hydrolyze any $COCl_2$ in the gases to HCl and $CO_2$. The gases are then further scrubbed to remove sulfur oxides and passed through an incinerator to oxidize CO to $CO_2$.

BRIEF DESCRIPTION OF THE DRAWING

The sole drawing of the invention is a flowsheet illustrating the waste gas treatment system of the invention.

DESCRIPTION OF THE INVENTION

Referring now to the drawing, waste gases at 2, which may be the effluent gases of a chlorination system wherein metal chlorides are formed, pass first through line 4 to dust filter 6, comprising a suitable cloth or ceramic filter material, for example, wool, capable of removing particles as small as 10 microns. The gases then pass alternatively through a line 10 or a line 12 to activated carbon adsorber 20. The gases are passed through line 12 when greater than 1000 ppm $Cl_2$ is present in the gases. The gases in line 12 pass through a chlorine converter 14 which forms no part of this invention. Such a converter is described and claimed in patent application Ser. No. 765,281, entitled "Waste Gas Treatment System for Chlorine Gas from Production of Aluminum Chloride" filed Feb. 3, 1977, and assigned to the assignee of this invention.

Carbon adsorber 20 contains activated carbon having a particle size range of preferably 4–8 mesh (U.S. Sieve Series). The gases are passed through adsorber 20 at a velocity of 6–18 meters/min to provide a residence time within the adsorber of about 3 seconds. To assure maximum adsorption of the metal chlorides, such as, for example, aluminum chloride, silicon chloride, or titanium chloride, from the gas stream, a second carbon adsorber of similar dimensions 22 preferably is used in series with carbon absorbers 20 and connected thereto by a line 16. The term "metallic chlorides" as used herein is intended to include silicon chloride.

Line 18 conducts the gases, stripped of their metal chlorides content, to HCl absorber 30 which is maintained at a temperature of 20°–100° C. Preferably, a series of identical HCl adsorbers 30, 40, and 46, such as shown in the drawing, are utilized to remove HCl from the gas. HCl absorber 30 may be a packed bed filled with polypropylene tower packing such as MASPAC (manufactured by Clarkson Controls and Equipment Company). HCl absorber 30 may also be of other suitable designs, e.g. tray columns, which facilitate gas-liquid contacting. Water or weak hydrochloric acid (0–20% HCl) is admitted to the top of adsorber 30 via line 32 to flow countercurrently to the gas flow thereby stripping HCl values from the gases. The water or acid entering at line 32 can be provided from HCl absorbers 40 or 46 or from an external source. The HCl values are removed via line 34 as an aqueous HCl solution of about 32% by weight HCl. The HCl values may also be removed from the system via absorbers 40 or 46.

The gases ordinarily exit HCl absorber 30 at line 36 from which they proceed to HCl absorber 40. Alternatively, the gases may proceed directly to HCl absorber 46 or to hydrolyzer 50. Additional HCl values are stripped from the gases when absorbers 40 and 46 are utilized.

The gases exit HCl absorber 46 at line 48 from which they pass into a hydrolyzer vessel 50 in which $COCl_2$ is reacted to HCl and $CO_2$ by contacting the gases with $H_2O$ or weak HCl acid in the presence of activated carbon. Vessel 50 contains acticated carbon preferably of 4–8 mesh particle size (U.S. Sieve Series). HCl is removed in aqueous form at line 54 from which a portion can be recirculated back to the hydrolyzer 50 via lines 56, 58, and pump 60. The remainder of the HCl may be fed back to HCl absorber 46 via line 52. Line 52 may be alternatively connected to absorber 30 or 40. Makeup $H_2O$ is added to hydrolyzer 50 through line 62.

The gases passing out of hydrolyzer 50 flow to scrubber 80 through line 64. NaOH, or $Na_2CO_3$, and $H_2O$ are added to scrubber 80 via line 66 in sufficient quantities to maintain the pH at 5.6 to selectively scrub $SO_2$ but not $CO_2$ from the gases flowing therein. Gases leaving scrubber 80 are then conveyed in line 68 to CO incinerator 84 where CO is burned with air or oxygen from line 86 to form $CO_2$. The gases leaving incinerator 84 by line 90 can be discharged to the atmosphere by any suitable means.

The metal chlorides designated as $M_xCl_y$ in the drawing and further defined as capable of hydrolyzing to form HCl and the corresponding metal oxides are stripped from the gases by adsorbers 20 or 22 and are, in turn, removed from the activated carbon bed therein to thereby renew the bed by passing a stripping gas at a temperature of from 100° to 400° C., preferably about 250° C. at a velocity of about 3–15 meters/min for a period of about 4–16 hours through adsorber 24 in the drawing which is identical to adsorbers 20 and 22 and may be interchanged therewith. The stripping gas, which may be nitrogen or any other inert or non-reactive gas, such as $CO_2$, leaves adsorber 24 together with the entrained metal chloride via line 26 to pass to a hydrolyzer 70 containing a fluid particle bed which consists of carbon or metal oxides of the classes IIA, IIIA, IVA, IVB, or mixtures thereof, of a particle size range of 0.044 mm to 0.30 mm. Steam at a temperature of from 100°–150° C. enters the particle bed in hydrolyzer 70 at line 72 and is admixed with the gas to hydrolyze the metal chlorides to metal oxides plus HCl, e.g. $SiCl_4$ forms $SiO_2 + HCl$. The metal oxides remain in the bed and the stripping gas and HCl leave the bed at line 74 to interconnect with line 18 just prior to its entry into HCl absorber 30 from which the HCl from metal chloride hydrolyzer 70 is removed as previously described.

Adsorbers 20, 22, and 24, as previously mentioned, are interchangeable and, as shown in the drawing, can be cascaded. In the embodiment illustrated, adsorber 24 after complete regeneration would replace adsorber 22 which would, in turn, replace adsorber 20. Adsorber 20, which would contain most of the adsorbed metal chlorides, would then be regenerated as previously described for adsorber 24. In each instance then the cleanest adsorber would be used as the second adsorber in the series to assure complete adsorption of the metal chlorides from the gas.

The water which enters hydrolyzer 70 at line 72 is admitted at a temperature above its dew point. Conveniently, this may comprise steam at atmospheric pressure. The hydrolyzer 70 is maintained at a sufficient temperature, (usually about 100° C.) to ensure that the hydrolysis reaction of the metal chloride and the water vapor is above the dew point of the blended gas stream to prevent formation of gelatinous material in the particle bed which could otherwise plug the reactor. Conveniently, this could be done by using external heating such as an external steam jacket or the like.

It has been found that the conversion of silicon chloride is somewhat temperature-dependent and is reduced upon raising the temperature significantly above 100° C. For example, for a given bed volume, velocity, and molar ratio of $H_2O$ to $SiCl_4$, it has been found that a temperature of 100° C. at atmospheric pressure can result in a conversion of greater than 95% silicon chloride while a temperature of 125° C. under otherwise identical conditions results in only 70% conversion, while a temperature of 150° C. with other conditions again remaining the same lowers the conversion to below 25%. Preferably, therefore, the temperature in hydrolyzer 70 should not rise above about 110°–115° C. To obtain the desired hydrolysis of the metal chloride to metal oxide, a large excess of water vapor is necessary. The molar ratio of $H_2O$ to $M_xCl_y$ should be at least about 10 and may be as high as 75.

The solid material used in the bed comprises particulate carbon or metal oxide of the classes IIA, IIIA, IVA, IVB, or mixtures thereof. Common river sand can be used. When a fluidized bed is utilized, the solid material, e.g. sand, should be ground to 44–297 microns (−50 to +325 mesh U.S. Sieve Series) and preferably 74–149 microns (−100 to +200 mesh U.S. Sieve Series). However, when using such materials as river sand, it is necessary to provide a preliminary purification step to reduce the amount of iron in the sand. Typically, a river sand may have an iron content of from about 1-2% total iron. For reasons which are not entirely understood, the presence of iron appears to interfere with the process. Leaching of river sand with concentrated hydrochloric acid provides a convenient method of removing iron oxide from the sand. Such leaching reduces the iron content to as little as 0.3% by weight which reduces the operational problems. Preferably, when silica is used in the particle bed it is a quartzite blasting sand. Such sand contains less than about 0.03% by weight iron. It has also been found that $Al_2O_3$ can be used in place of the silica. However, the additional cost of the alumina may not justify its use as a substitute from an economic standpoint.

The space time of the gases within hydrolyzer 70 may vary from as little as 0.03 and preferably 0.065 minutes to much longer time periods of as much as a minute or more depending upon the velocity of the gases passing therethrough, the ratio of water vapor to $M_xCl_y$ gas in the reactor, and the height of the bed. The relationship of the space time to the bed height and velocity can be expressed by the following equation:

$$\text{Space time} = \frac{\text{Bed Height}}{\text{Velocity}}$$

The hydrolysis may be carried out in a static, fluidized, or entrained bed. A fluidized bed is preferred. The velocity of the gases (total velocity of steam and metal chloride gases) passing through a fluidized bed should be at least about 0.1 centimeters/second to provide minimum fluidization in the particle size range specified. Preferably, the velocity is from about 1 to 200 centimeters/second for −100 to +200 mesh (U.S. Sieve Series) particles.

When using fluidized beds having internal diameters of greater than 0.25 meters (10 inches)—or the equivalent for non-circular beds—it has been found that the steam should enter the bottom of the bed while the metal chloride gases should be injected into the bed at a minimum of 0.05 meters to 0.076 meters (2-3 inches) above the steam entry. Furthermore, the entrance velocity of the metal chloride gases into beds of this size or larger should be at least 42.7 meters/sec. (140 ft./sec) to prevent formations of lumps of bed material. For fluidized beds smaller than 0.25 meters, the point of injection and the velocity of the metal chloride gas has not been found to be critical. Typically, the length of the nozzle in the bed should be less than 1/5 of the internal diameter of the fluidized bed vessel. Conventional bag filters, for example, felted Teflon, are used to retain the particles in the fluidized bed vessel.

It should also be noted that the use of a fluidized bed appears to be particularly effective in eliminating the vapors or smoke resulting from the hydrolysis of the metal chlorides, particularly titanium tetrachloride.

The bed height is also important and must be a minimum of about 10 centimeters, preferably about 40 to 60 or more centimeters in height, to again provide sufficient space time of the gases within the bed, in the particle size range and gas velocity range specified.

The following examples illustrating the hydrolysis of silicon chloride will serve to illustrate the metal chloride hydrolysis portion of the process.

EXAMPLE 1

Acid leached river sand having a particle size range of 74-149 microns was packed into a 2.54 centimeter diameter tubular reactor to a height of about 26 centimeters. The reactor was heated to a temperature of about 100° C. Steam and gaseous silicon chloride were admitted to the bottom of the reactor at a velocity of about 3.5 to 4.2 centimeters per second at atmospheric pressure plus pressure due to bed height to provide a total residence time within the reactor of about 0.1 minute. Table I illustrates the percentage of conversion of the silicon chloride for various runs wherein the molar ratio of $H_2O$ to silicon chloride was varied. In each instance, the amount of unreacted silicon chloride was determined by passing the gases from the reactor through a water trap containing a known amount of deionized water. After each run, the trap was re-weighed and a sample of liquid from each trap was titrated with 0.1 normal sodium hydroxide solution. From this titration, the amount of HCl in the trap could be calculated. Using the reaction equation $SiCl_4 + 2H_2O = 4HCl + SiO_2$, the amount of silicon chloride used during the test could be back-calculated from the amount of HCl found in the water trap. This calculation provided a double check with the amount of silicon chloride used as determined by weighing the silicon chloride feeder flask before and after particular tests. The water trap and exhaust tube were then placed in a 120°-150° C. drying oven to evaporate water and acid. The solid residue left in the trap and exhaust tube was weighed as 100% silicon dioxide ($SiO_2$). This solid residue represented the $SiCl_4$ not hydrolyzed in the fluid bed. Using the above equation and the weight of the solids found in the trap and exhaust tube, the amount of silicon chloride reacted was calculated. The percentage of silicon chloride was then calculated from the following equation:

Percentage conversion of silicon chloride =

$$100 \times \left(1 - \frac{\text{grams silicon chloride unreacted}}{\text{grams silicon chloride fed to reactor}}\right)$$

An analysis of the solids found in the water and exhaust tube after a normal run showed that 92 to 94% of the material was silicon dioxide. Thus, the assumption of 100% silica in the solids left in the water trap and exhaust trap after drying results in a conservative calculation of the percentage of silicon chloride converted.

TABLE I

| Silicon Chloride Conversion v. $H_2O/SiCl_4$ Molar Ratio | |
|---|---|
| $H_2O/SiCl_4$ Molar Ratio | Conversion of $SiCl_4$ to Silica in Percentage |
| 15 | 96 |
| 20 | 98 |
| 28 | 99 |
| 36 | 100 |
| 45 | 100 |
| 71 | 100 |

The results indicate that when using a velocity of 3.5 to 4.2 centimeters per second and a bed height sufficient to provide a space time of about 0.1 minute, conversions of 95% or better can be obtained using a wide range of $H_2O$ to silicon chloride ratios.

EXAMPLE 2

The same experiment was repeated, with the velocity, however, raised to 4.5 to 5 centimeters per second and the bed height lowered to about 20 centimeters thus providing a space time of about 0.065 minutes. As will be noted in Table II, with this reduced residence time a molar ratio of $H_2O/SiCl_4$ of at least about 35 to 40 is desired.

TABLE II

| $H_2O/SiCl_4$ Ratio | Conversion of $SiCl_4$ to Silica in Percentage |
|---|---|
| 16 | 74 |
| 36 | 96 |
| 62 | 99 |
| 78 | 92 |

EXAMPLE 3

The same reaction was repeated with an empty tube reactor. The space time was considerably increased by lowering the overall velocity of the gas through the reactor. The results are tabulated below in Table III.

TABLE III

| Space Time in Minutes | $H_2O/SiCl_4$ Mole Ratio | Conversion of $SiCl_4$ to Silica in Percentage |
|---|---|---|
| 0.18 | 59.1 | 17.9 |
| 0.24 | 73 | 65.6 |
| 0.25 | 113 | 79 |
| 0.33 | 33 | 80.3 |
| 0.36 | 97 | 93 |
| 0.41 | 57 | 81.0 |

Comparing these results with the results of Table I wherein a residence time of 0.1 minute under the same conditions resulted in a conversion of better than 95% using a molar ratio of $H_2O$ to silicon chloride of less than 20, it can be seen that the presence of the silica in the reactor bed in accordance with the invention greatly reduces the space time required to obtain a high percentage of conversion of silicon chloride to solid silica.

EXAMPLE 4

The experiment of Example 1 was repeated using a fixed molar ratio of $H_2O/SiCl_4$ of 63 but varying the bed temperature from 100 to 125 and 150° C. and using a velocity of 4.6 centimeters per second and a space time of 0.077 minutes.

TABLE IV

| Conversion of Silicon Chloride to Silica in Percentage | Bed Temp. in °C. |
|---|---|
| 98% | 100 |
| 70% | 125 |
| 24% | 150 |

The results indicate that at a given velocity, space time, and molar ratio, higher temperatures result in a lowering of the percentage of conversion of silicon chloride to silica.

EXAMPLE 5

Several series of runs were made similar to that of Example 1 to show the effect of space time on the percentage of conversion by varying bed height. In this instance, the gas velocity ranged from about 6.6 centimeters per second to 7.6 centimeters per second. When the two series of runs were made, the first series had a water to silicon chloride ratio of about 34 to 36, while the second run had a ratio of about 56 to 70. In each instance, the bed temperature was maintained at about 100° C.

TABLE V

| Mole Ratio $H_2O$ to Silicon Chloride | Bed Height in Centimeters | Conversion of Silicon Chloride to Silica in Percentage |
|---|---|---|
| 34–46 | 10 | 36 |
| 34–46 | 20 | 50 |
| 34–46 | 30 | 62 |
| 34–46 | 40 | 72 |
| 34–46 | 50 | 75 |
| 34–46 | 60 | 78 |
| 56–69 | 10 | 56 |
| 56–69 | 20 | 73 |
| 56–69 | 30 | 78 |
| 56–69 | 40 | 86 |
| 56–69 | 50 | 90 |
| 56–69 | 60 | 92 |

The results indicate that increasing the space time increases the percent conversion of $SiCl_4$. The results also indicate that a longer space time is needed when the molar ratio of $H_2O$ to silicon chloride is below about 50.

EXAMPLE 6

Another experiment was conducted in accordance with Example 1 using a space time of about 0.04 to 0.05 minutes with an $H_2O$ to silicon chloride ratio of about 33 to 53 in which the velocity was varied to show the effect on gas velocity on percentage conversion of the silicon chloride.

TABLE VI

| Velocity cm/sec | Conversion of Silicon Chloride to Silica in Percentage |
|---|---|
| 3.8 | 95 |
| 6.8 | 75 |
| 15 | 42 |
| 21 | 27 |
| 25.1 | 30 |

In this instance, the bed height was increased with increasing velocity to maintain the space time approximately constant. Thus, it can be seen that, in spite of the same space time used, higher gas velocities actually result in lowered percentage of conversion. Thus, the space time should be increased when the gas velocity is greater than about 6 centimeter per second when using particles of 74–149 microns (−100 to +200 mesh U.S. Sieve Series).

EXAMPLE 7

14.2–20.5 m³/min (505 SCFM–730 SCFM) of reactor waste gas was fed to the waste gas treatment system. The gas stream composition was $CO_2$—34%–49%, CO—17.5%–19.8%, HCl—5.5%–6.6%, $COCl_2$—0.2-0%–0.26%, $SiCl_4$—0.14%–0.15%, $Cl_2$<0.01% with the balance $N_2$. An aqueous HCl solution of 28–30% hydrochloric acid was produced. The HCl solution contained no gelatinous materials. Less than 10 ppm $COCl_2$ was detected in the gas leaving the $COCl_2$ hydrolyzers. No CO or $Cl_2$ was detected in the stack. $COCl_2$ in the stack was less than 0.05 ppm. After 30 hours of operation, the primary adsorber was regenerated with about 4.5 m³/min (160 SCFM) of a gas stream at 90° C. of the following composition ($N_2$—75%, $Cl_2$—11%, CO—14%) for four hours. The adsorber was then further heated with 3.2–5.6 m³/min (115–200 SCFM) of $N_2$ at 115° C.–300° C. for four hours. The stripped gases were fed to a metal chlorides hydrolyzer containing a fluidized bed of ⅓ by weight metal grade $Al_2O_3$ and ⅔ by weight high purity sand (PGS Oklahoma #1 dry). The bed was about 2.44 m (8 feet) high by 1.68 m (5.5 feet) diameter. Steam was also fed to the chlorides hydrolyzer at a rate of about 7.6 kg/min (17 lbs/min). The temperature of the fluidized bed was maintained at 377°–388° K. (220° F.–240° F.). The regeneration gas temperature was about 453° K. (356° F.); the velocity of the regeneration gases through the feed nozzles was 91.5–122 m/sec (300–400 ft/sec). The gases leaving the chlorides hydrolyzer were cooled and stripped of HCl in one of the HCl adsorbers. No gelatinous precipitate could be detected in any of the HCl absorption towers nor was there any indication of fluidized bed agglomeration. About 193 kg (425 lbs) of $SiCl_4$ was regenerated from the carbon adsorber.

Having thus described the invention, what is claimed is:

1. A process for the purification of waste gases containing $COCl_2$, and up to 15% by weight gaseous metal chlorides capable of hydrolyzing to form HCl and the corresponding metal oxides which comprises:
    A. Removing the metal chlorides from the waste gases by:
        (1) passing the waste gases through a bed of activated carbon to remove the gaseous metal chlorides;
        (2) passing stripping gas through the activated carbon bed to remove the metal chlorides deposited on the bed;
        (3) passing the stripping gas and gaseous metal chlorides through a bed of solid particles selected from the class consisting of carbon or metal oxides of the groups IIA, IIIA, IVA, IVB, and mixtures thereof while contacting the gases with water vapor at a temperature of 100°–150° C. to convert said metal chlorides to HCl and the corresponding metal oxides;
    B. Removing HCl from the waste gas by contacting the waste gases with liquid water at a temperature of from 20°–100° C. to remove HCl vapors therefrom; and
    C. Removing $COCl_2$ from the waste gas by passing the waste gases through a bed of activated carbon in the presence of water to hydrolyze $COCl_2$ in the gases to HCl and $CO_2$.

2. The process of claim 1 wherein the stripped gases are contacted with $H_2O$ vapor at an $H_2O/M_xCl_y$ ratio of at least 10 and as high as 75 to ensure complete hydrolysis of the metal chlorides.

3. The process of claim 2 wherein the hydrolysis of the metal chloride is carried out at a temperature of from 100°–115° C.

4. The process of claim 2 wherein the particles in the bed of step A have a particle size range of −50 to +325 mesh U.S. Sieve Series.

5. The process of claim 4 wherein said particles have an iron content of less than 0.3% by weight.

6. The process of claim 2 wherein the space time of the gases in the said bed of solid particles is from about 0.03 to 1 minute.

7. The process of claim 6 wherein the velocity of the gases in said bed is from 1–20 cm/sec.

8. The process of claim 7 wherein said bed has a minimum height of at least 10 centimeters.

9. The process of claim 1 wherein the waste gases also contain sulfur dioxide which is removed by scrubbing in a scrubber maintained at a pH of about 5.6 by addition of sufficient NaOH or $Na_2CO_3$ to selectively remove sulfur dioxide after the $COCl_2$ hydrolysis step.

10. The process of claim 9 wherein the waste gas also contains partially oxidized carbon compounds and the scrubbed gases are incinerated to oxidize any partially oxidized carbon compounds to $CO_2$.

11. The process of claim 1 wherein the HCl formed in step A(3) is contacted with liquid water to remove HCl vapors from the gas stream passed through said bed of solid particles.

12. A process for the purification of waste gases containing $COCl_2$, sulfur dioxide and up to 15% by weight gaseous metal chlorides capable of hydrolyzing to form HCl and the corresponding metal oxides which comprises: removing the gaseous metal chlorides from the waste gases by adsorption on activated carbon; stripping the metal chlorides from the activated carbon with a stripping gas; contacting the stripping gas and metal chlorides with water vapor at a temperature of from 100°–150° C. in a bed of solid particles selected from the class consisting of carbon or metal oxides of the groups IIA, IIIA, IVA, IVB, and mixtures thereof, to convert said metal chlorides to HCl and the corresponding metal oxides; thereafter contacting the waste gases with liquid water at a temperature of from 20°–100° C. to remove HCl vapors therefrom; passing the waste gases through a bed of activated carbon in the presence of water to hydrolyze $COCl_2$ in the waste gases to HCl and $CO_2$; amd scrubbing the waste gases in a scrubber maintained at a pH of about 5.6 by addition of sufficient NaOH or $Na_2CO_3$ to selectively remove sulfur dioxide after the $COCl_2$ hydrolysis step.

* * * * *

UNITED STATES PATENT AND TRADEMARK OFFICE
CERTIFICATE OF CORRECTION

PATENT NO. : 4,157,374
DATED : June 5, 1979
INVENTOR(S) : Lee Graydon Carpenter et al.

It is certified that error appears in the above-identified patent and that said Letters Patent are hereby corrected as shown below:

Col. 1, line 30    Change "Lowe" to --Low--.

Col. 3, line 15    Change "absorbers" to --adsorber--.

Col. 3, line 21    Change "adsorbers" to --absorbers--.

Col. 3, line 29    Change "adsorber" to --absorber--.

Col. 3, line 47    Change "acticated" to --activated--.

Signed and Sealed this

Twenty-eighth Day of August 1979

[SEAL]

Attest:

Attesting Officer

LUTRELLE F. PARKER
Acting Commissioner of Patents and Trademarks